UNITED STATES PATENT OFFICE.

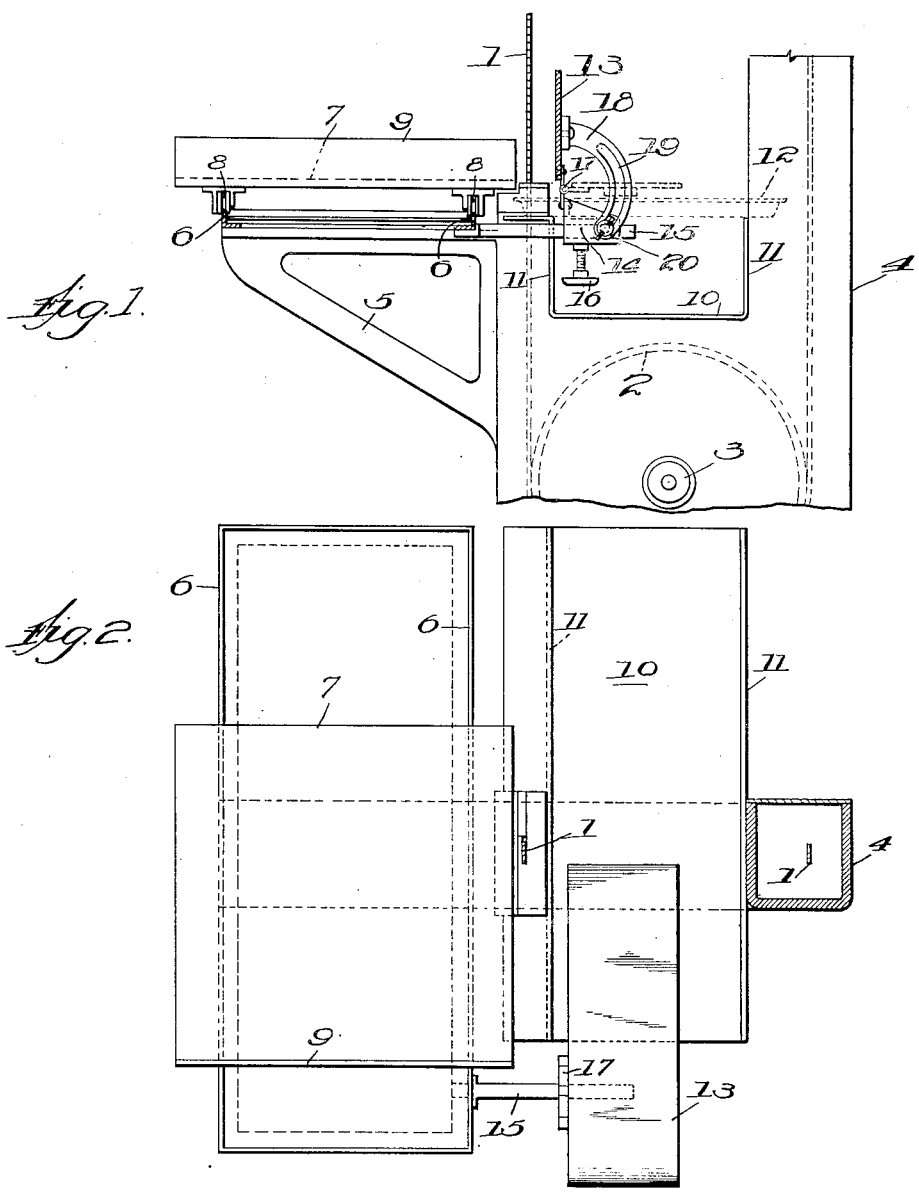

JAY W. VAUGHAN, OF CHICAGO, ILLINOIS.

COMBINED WORK-TABLE AND GAGE.

1,336,799.  Specification of Letters Patent.  Patented Apr. 13, 1920.

Original application filed May 26, 1919, Serial No. 299,718. Divided and this application filed September 27, 1919. Serial No. 326,876.

*To all whom it may concern:*

Be it known that I, JAY W. VAUGHAN, a citizen of the United States, and a resident of the city of Chicago, in the county of Cook and the State of Illinois, have invented certain new and useful Improvements in Combined Work-Tables and Gages, of which the following is a specification, reference being had to the accompanying drawings, forming a part thereof.

The purpose of this invention is to provide a conveniently adjustable gage member for use in conjunction with a band saw and especially adapted for such use with a saw designed for cutting or slicing meat. For such use the gage member is further adjustable into the plane of the work table to provide supplemental support for the material. The invention consists of the features and elements and their combination which affords these results as more fully described hereinafter and shown in the drawings and as indicated by the claims.

In the drawings:

Figure 1 is a partial front elevation of a band saw machine provided with a combined work table and gage embodying this invention.

Fig. 2 is a plan view of the parts shown in Fig. 1 being taken as a horizontal section through the machine just above the work table.

This application is in part a divisional of my application, Serial No. 299,718, filed May 26, 1919, and all of its features, whether shown in said original application or not, are directly applicable to the type of band saw-machine therein illustrated. The machine includes an endless metallic saw blade, 1, supported for travel upon upper and lower guide wheels or pulleys of which the lower one is indicated in dotted lines in Fig. 1 at 2, its bearing being shown at 3, as secured in the frame, 4, which is formed to constitute a housing for the wheel, 2, and for most of the saw blade, 1, in its travel. At a convenient height and adjacent the vertical ply of the blade, 1, the frame, 4, is provided with a bracket, 5, supporting a pair of horizontal rails, 6, extending substantially parallel to the plane of the blade, 1, for supporting a movable work table 7, which is fitted with wheels or rollers, 8, adapted to run upon the rails, 6. At one limit of its travel, the table, 7, extends almost entirely forwardly of the cutting edge of the blade, 1, which is the toothed edge seen in Fig. 1; but the range of travel of said table, 7, permitted by the length of the rails, 6, allows it to move past this cutting edge, so as to carry its rear flange, 9, up to or slightly beyond the transverse plane of said edge of the blade, 1. Said flange, 9, thus serves to assist in forcing a piece of meat or other material to be cut by the saw past the saw, so as to be completely cut through thereby, as the table, 7, travels along the rails, 6.

At the other side of the saw blade, 1, the outline of the frame, 4, extends downwardly some little distance from the plane of the work table, 7, and supports a receiving pan, 10, which extends for some distance in front of the transverse plane of the cutting edge of the blade, 1, and for the same distance beyond said plane as the rails, 6, upon which the work table, 7, travels. The pan is thus in convenient position to receive anything cut off from material carried by the work table, 7, in its movement past the saw blade, 1. The side walls, 11, of the pan, 10, terminate some distance below the plane of the work table, 7, so that when preferred a tray or platter indicated in dotted outline at 12 may be placed on the upper edges of the pan to receive the meat cut off.

For gaging the thickness of the pieces cut off by the saw, as in the case of chops or steak, there is provided a gage plate, 13, carried by a fitting member, 14, which is slidably adjustable along a non-circular bar, 15, extending below and parallel to the plane of the work table, 7, past the plane of the saw blade, 1, as shown in the drawings. The fiting, 14, is provided with a clamp screw, 16, by which it may be secured at any position of its sliding adjustment along the rod or bar, 15, and preferably the gage plate, 13, is attached or connected to the fitting, 14, by a hinged connection at 17, whose axis is substantially in the plane of the work table, 7, so that the plate, 13, if desired, may be folded downwardly into the plane of said work table, 7, to serve as a supplemental support for the portion of the meat to be cut off, especially in cases where a large and fairly heavy piece is to be severed from the body of meat carried on the table, 7. In this way the overhanging portion of the meat is supported during its approach to the saw blade, 1, and its weight is thus prevented from twisting the saw or distorting the meat in a way to interfere with making the cut as intended. The plate, 13, terminates substantially at the transverse plane of the cutting edge of the saw blade, 1, so as not to interfere with the discharge of the cut off portion into the receiving pan or other receptacle provided, as it is carried past the saw. To secure the plate, 13, at either limit of its adjustment about the hinge axis, 17, it is provided with a curved and slotted segment, 18, whose slot, 19, is substantially 90° in length, and traverses a clamping screw, 20, in the side of the fitting, 14, by which clamping screw the segment is frictionally held at either limiting position of adjustment as desired.

I claim:

1. In combination with a saw and a work table extending therefrom at one side, a flat member and means for supporting it at the other side of the saw in the plane of said table, said member being adjustably connected to its support to permit folding it into a plane perpendicular to that of the work table to serve as a gage, and means for securing said flat member at either position of its adjustment.

2. In the combination defined in claim 1, the flat member being also adjustable bodily through a limited range toward and from the saw to vary its spacing therefrom when serving as a gage, and means for securing it any position in said range of adjustment.

3. In combination with a saw and a work table extending therefrom at one side, a flat member supported at the other side of the saw in the plane of said table, extending toward but not materially beyond the transverse plane of the cutting edge of the saw, and a receiver at the same side of the saw as said flat member, and below the plane of the work table, extending beyond said cutting edge of the saw to receive material cut off thereby and discharged from the end of said flat member adjacent the saw blade.

4. In combination with a saw and a work table extending therefrom at one side, a flat member and supporting means therefor, comprising a non-circular arm extending transversely of the plane of the saw and beyond the plane of the work table, a fitting slidably mounted on said arm embracing it, and provided with means for fixing it to the arm, together with a hinged connection supporting said flat member on said fitting in the plane of the work table but adapted to permit folding said member into a plane perpendicular to said table and at the other side of the saw therefrom, and a brace extending from said member to the fitting and adjustably securable thereto for holding the member either in the plane of the work table or perpendicular thereto.

5. In the combination defined in claim 4, said brace being in the form of a slotted segment attached to the under face of said flat member, with its slot traversing a clamping screw secured in the fitting.

In testimony whereof I have hereunto set my hand at Chicago, Illinois, this 24th day of September, 1919.

JAY W. VAUGHAN.